United States Patent
Aoyama et al.

(10) Patent No.: US 8,314,513 B2
(45) Date of Patent: Nov. 20, 2012

(54) POWER TRANSMISSION CONTROL DEVICE, POWER TRANSMISSION DEVICE, POWER RECEPTION CONTROL DEVICE, POWER RECEPTION DEVICE, ELECTRONIC APPARATUS, AND CONTACTLESS POWER TRANSMISSION SYSTEM

(75) Inventors: Takashi Aoyama, Chino (JP); Haruhiko Sogabe, Chino (JP)

(73) Assignee: Seiko Epson Corporation, Tokyo (JP)

( * ) Notice: Subject to any disclaimer, the term of this patent is extended or adjusted under 35 U.S.C. 154(b) by 277 days.

(21) Appl. No.: 12/715,614

(22) Filed: Mar. 2, 2010

(65) Prior Publication Data

US 2010/0225173 A1 Sep. 9, 2010

(30) Foreign Application Priority Data

Mar. 9, 2009 (JP) ................. 2009-055102

(51) Int. Cl.
  *H01F 27/42* (2006.01)
  *H01F 37/00* (2006.01)
  *H01F 38/00* (2006.01)
(52) U.S. Cl. ........................ 307/104; 320/108
(58) Field of Classification Search .......... None
  See application file for complete search history.

(56) References Cited

U.S. PATENT DOCUMENTS 5,231,563 A * 7/1993 Jitaru .................. 363/98

FOREIGN PATENT DOCUMENTS

| JP | 62213571 | * | 9/1987 |
| JP | 200586866 | * | 3/2005 |
| JP | A 2005-086866 | | 3/2005 |

OTHER PUBLICATIONS

WO 2006101285 to Cho et al., Mar. 29, 2007.*
KR 2008024885 to Lee et al., english abstract, Mar. 19, 2008.*

* cited by examiner

*Primary Examiner* — Rexford Barnie
*Assistant Examiner* — Justen Fauth
(74) *Attorney, Agent, or Firm* — Oliff & Berridge, PLC

(57) ABSTRACT

A power transmission control device controls a power transmission device in a contactless power transmission system that transmits power from the power transmission device to a power reception device through electromagnetically coupling a primary coil and a secondary coil. The power transmission control device includes a power transmission driver control section that controls drive timings of a plurality of switching elements of a power transmission driver that drives the primary coil, the power transmission driver control section variably controlling the power to be transmitted from the power transmission device to the power reception device.

15 Claims, 11 Drawing Sheets

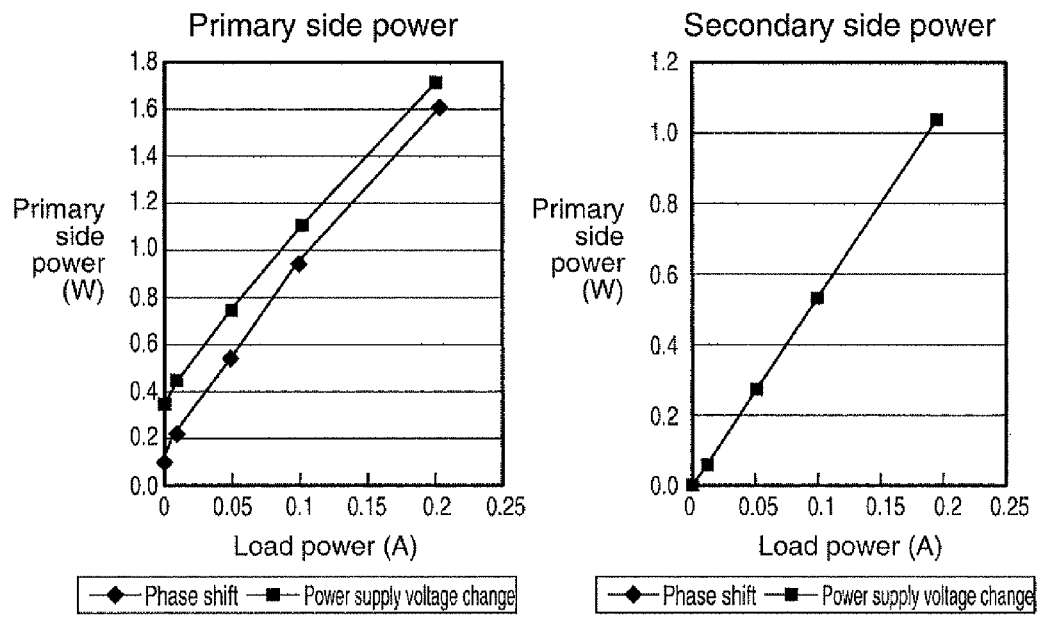
FIG. 5A
FIG. 5B
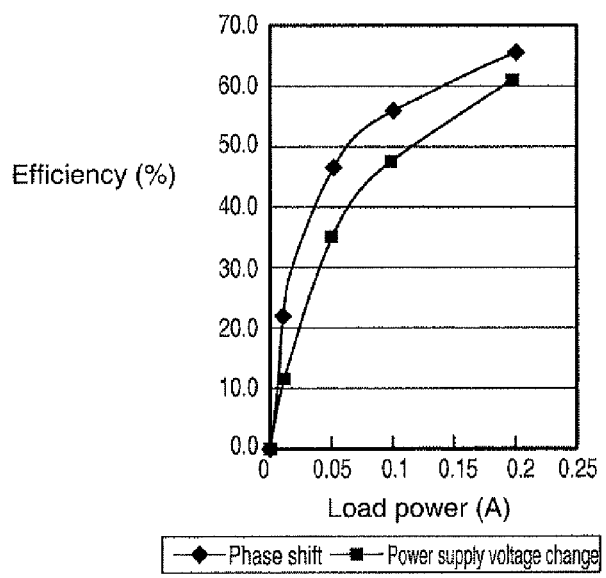
FIG. 5C

Without zero-voltage switch capacitors

With zero-voltage switch capacitors

POWER TRANSMISSION CONTROL DEVICE, POWER TRANSMISSION DEVICE, POWER RECEPTION CONTROL DEVICE, POWER RECEPTION DEVICE, ELECTRONIC APPARATUS, AND CONTACTLESS POWER TRANSMISSION SYSTEM

The present application claims a priority based on Japanese Patent Application No. 2009-55102 filed on Mar. 9, 2009, the contents of which are incorporated herein by reference.

BACKGROUND

1. Technical Field

The present invention relates to power transmission control devices, power transmission devices, power reception control devices, power reception devices, electronic apparatuses, and contactless power transmission systems.

2. Related Art

In recent years, contactless power transmission (non-contact power transmission) which utilizes electromagnetic induction to enable power transmission without metal-to-metal contact has been attracting attention. Among application examples of contactless power transmission, an application thereof to charging a portable telephone, a household appliance (for example, telephone handset), and the like has been proposed.

When a contactless power transmission system is to be put in practical use, a reduction of power consumption of the contactless power transmission system is an important issue. For example, the power level of transmission power may be kept low during periods other than a period in which a load current is being supplied to a load connected to the secondary side, which contributes to suppression of wasteful power consumption. As a method of reducing the power level of transmission power, reducing the power supply voltage (operation voltage) of the driver circuit (power transmission driver) that drives the primary coil is effective.

For example, JP-A-2005-86866 describes a technology in which a commercial AC power supply is converted to a DC voltage by an AC/DC converter circuit, the level of the DC voltage is converted to a desired level by a DC/DC converter circuit, the obtained DC voltage is converted to an AC signal by a DC/AC converter circuit, and then the AC signal is supplied to a coil transformer (primary coil). By using this technology in a power transmission device of a contactless power transmission system, the power supply voltage (operation voltage) for the primary coil can be reduced.

In the power transmission device of the contactless power transmission system described above, a power transmission driver having a plurality of switching elements (for example, power MOS transistors) may be used. The power transmission driver AC-drives the primary coil (in this case, the transmission driver functions as a DC/AC converter circuit) based on a power supply voltage (for example, a DC voltage obtained by AC-to-DC converting the commercial power supply).

Specifically, the transmission driver may be made of a full-bridge inverter (that includes four switching elements connected in a bridge configuration). On-loss is generated when each of the switching elements is turned on. For example, when the switching elements are composed of MOS transistors, on-loss of the MOS transistors is generated. Further, as parasitic diodes (body diodes) are present between sources and drains of the MOS transistors, on-loss would also be generated in the parasitic diodes (body diodes) through which regeneration current flows.

On-loss on each of the switching elements composing the power transmission driver (i.e., power loss of the switching element itself and power loss at the parasitic diode through which regeneration current follow) may be negligible when the power supply voltage (operation voltage) of the power transmission driver is high. However, as the power supply voltage of the power transmission driver lowers, the proportion of the on-loss of the switching elements with respect to the entire electrical power increases, and the on-loss becomes more prominent, which leads to a problem in that the efficiency of the power transmission driver (i.e., the conversion efficiency of the DC/AC converter circuit) is lowered.

In other words, in order to reduce the power consumption of a contactless power transmission system, the power supply voltage (operation voltage) of its power transmission driver may be lowered. However, with a reduction in the power supply voltage (operation voltage), on-loss relating to each of the switching elements forming the power transmission driver becomes more prominent, and therefore it is in effect difficult to lower the power supply voltage (operation voltage) of the power transmission driver to a desired voltage level, which poses a limitation to the reduction (control) of transmission power.

SUMMARY

In accordance with some embodiments of the invention, transmission power can be freely adjusted while maintaining the efficiency of a power transmission driver high, and desirable power saving in a system can be realized by sufficiently reducing the transmission power, for example, in a period where the level of the transmission power can be low. Moreover, it is also possible to provide a transmission power varying technology of high practical value that can be used in, for example, a novel foreign object detection system.

(1) A power transmission control device in accordance with an embodiment of the invention pertains to a power transmission control device that controls a power transmission device in a contactless power transmission system that transmits power from the power transmission device to a power reception device through electromagnetically coupling a primary coil and a secondary coil. The power transmission control device includes a power transmission driver control section that controls drive timings of a plurality of switching elements of a power transmission driver that drives the primary coil, wherein the power transmission driver control section variably controls the power to be transmitted from the power transmission device to the power reception device.

The present embodiment uses a transmission power control method that controls drive timings of the switching elements (for example, a phase shift control method), as the transmission power control method performed by the power transmission device in the contactless power transmission system. The power transmission driver includes a plurality of switching elements. Drive timings (ON/OFF timings) of each of the plurality of switching elements are controlled by the power transmission driver control section. For example, the phase shift control method controls a phase difference amount between driving signals that ON/OFF control each of at least two switching elements forming a current path, thereby controlling the energization time of the primary coil, whereby the transmission power is variably adjusted.

For example, by using the phase shift control method, the transmission power can be freely increased or decreased by performing phase adjustment (phase difference adjustment) among drive signals for ON/OFF driving the switching elements, without reducing the power supply voltage (operation voltage) of the power transmission driver, for example. Therefore, for example, even when the transmission power is lowered for power saving, a reduction in the efficiency of the power transmission driver can be suppressed. Also, by using the phase shift control method, so-called zero-voltage switching (switching control that is capable of bringing wasteful power consumption accompanying switching operations to substantially zero as either the voltage or the current becomes zero) can be readily achieved. In this case, the switching loss can be effectively reduced and, therefore, a reduction in the efficiency of the power transmission driver can further be suppressed.

According to the present embodiment, the transmission power can be effectively throttled down, such that the transmission power can be reduced close to the minimum necessary level. In this case, the weak transmission power brings about some favorable effects (effect on safety and effect on improved reliability). For example, a foreign object of metal or the like, even if being inserted, would scarcely generate heat, and a problem of undesired radiation accompanying switching of the switching elements would hardly occur.

(2) In accordance with an aspect of the embodiment of the invention, the power transmission control device may further include a transmission power control section that sets a value of power to be transmitted from the power transmission device to the power reception device, and the power transmission driver control section controls the power to be transmitted from the power transmission device to the power reception device based on the value of power.

Unless the present invention is used, for example, the power supply voltage (operation voltage) of the power transmission driver needs to be reduced by controlling the operation of an AC/CD conversion circuit, in order to reduce the power transmission value. However, in accordance with the present embodiment, the power supply voltage (operation voltage) of the power transmission driver does not need to be reduced. Specifically, the power transmission driver control section uses phase shift control to control the transmission power value to a desired transmission power value set by the transmission power control section.

(3) In the power transmission control device in accordance with another aspect of the embodiment of the invention, the power transmission driver may include a first driver and a second driver, wherein the second driver drives the primary coil such that a drive current flowing through the primary coil is opposite to a direction of a drive current flowing through the primary coil when driven by the first driver; each of the first driver and the second driver includes a first switching element to which a high potential power supply is supplied and a second switching element to which a low potential power supply is supplied; and the power transmission driver control section varies a phase difference between a first drive signal for driving the first switching element and a second drive signal for driving the second switching element.

In this aspect of the embodiment, the power transmission driver has the first driver and the second driver. The first driver and the second driver AC-drive the primary coil. In other words, the first driver and the second driver alternately drive the primary coil, and driving directions (directions in which a drive current flows) of the primary coil by the respective drivers are opposite to each other.

Also, each of the first driver and the second driver has the first switching element to which a high potential power supply is supplied (for example, that is connected to a high potential power supply) (i.e., a high potential power supply side switching element), and the second switching element to which a low potential power supply is supplied (for example, that is connected to a low potential power supply) (i.e., a low potential power supply side switching element). Specifically, the period in which both of the first switching element and the second switching element are turned on is a period in which the primary coil is energized, and a drive current is supplied to the primary coil during this energization period. Accordingly, by changing the length of the period of energizing the primary coil, the transmission power can be changed.

Therefore, the power transmission driver control section variably changes a phase shift amount (i.e., a phase difference) between a drive signal for the first switching element and a drive signal for the second switching element in each of the power transmission drivers, thereby variably controlling the transmission power. For example, when the phase shift amount (i.e., the phase difference) between a drive signal for the first switching element and a drive signal for the second switching element is zero, the duty is 100%, such that the on-period of the first switching element and the on-period of the second switching element perfectly overlap each other. On the other hand, for example, if the phase shift amount (i.e., the phase difference) between a drive signal for the first switching element and a drive signal for the second switching element is ±90 degrees, the duty is 50%, such that the period in which the on-period of the first switching element and the on-period of the second switching element overlap each other becomes to be halved compared to the case where the duty is 100%, and therefore the amount of transmission power is reduced by half. An ordinary circuit technology may be used to realize a circuit that variably changes a phase shift amount (a phase difference) between drive signals for the switching elements, and therefore the transmission power control with a phase shift control method can be readily realized.

(4) In the power transmission control device in accordance with still another embodiment of the invention, the power transmission driver may include a first transistor and a second transistor that are connected in series between a high potential side power supply and a low potential side power supply, and a third transistor and a fourth transistor that are connected in series between the high potential side power supply and the low potential side power supply, wherein the first transistor and the fourth transistor form a first driver and the third transistor and the second transistor form a second driver; the first driver and the second driver alternately drive the first coil; the second driver drives the first coil such that a drive current flowing through the first coil is opposite to a direction of a drive current flowing through the primary coil driven by the first driver; the power transmission driver control section outputs a first drive signal for driving the first transistor, a second drive signal for driving the second transistor, a third drive signal for driving the third transistor and a fourth drive signal for driving the fourth transistor, and changes a phase shift amount between the first drive signal and the fourth drive signal and a phase shift amount between the second drive signal and the third drive signal, thereby variably controlling transmission power to be transmitted from the power transmission device to the power reception device.

The embodiment above clarifies a more concrete example of the phase shift control. Specifically, the power transmission driver control section includes the first transistor and the second transistor that are connected in series between the high potential side power supply and the low potential side power supply, and the third transistor and the fourth transistor that are connected in series between the high potential side power supply and the low potential side power supply, wherein the first transistor and the fourth transistor form the first driver and the third transistor and the second transistor form the second driver. Switching timings of each of the first through fourth transistors are controlled by the first through fourth drive signals, respectively.

Then, the phase shift amount between the first drive signal and the fourth drive signal and the phase shift amount between the second drive signal and the third drive signal are variably changed, whereby the transmission power is variably controlled. An ordinary circuit technology may be used to realize a circuit that variably changes a phase shift amount among drive signals, and therefore the transmission power control by a phase shift control method can be readily realized.

(5) In the power transmission control device in accordance with another aspect of the embodiment of the invention, the power transmission driver control section may reduce transmission power to the power reception device in a period in which the power transmission device intermittently transmits power to the power reception device than in a normal transmission period.

This feature contributes to suppression of wasteful power consumption as the transmission power level is kept low in periods other than the period in which a load current is supplied to a load connected to the secondary side. In light of the above, in accordance with the present embodiment, the transmission power to the power reception device is lowered in the intermittent power transmission period than in the normal power transmission period.

(6) In the power transmission control device in accordance with still another aspect of the embodiment of the invention, the power transmission driver control section may reduce the transmission power to the power reception device in at least one of a standby period in which the power transmission device waits for an apparatus including the power reception device to be placed thereon, and a post-full-charge standby period in which, after a full-charge state of a battery connected to the power reception device has been detected, the necessity of recharging the battery is intermittently detected, than in the normal power transmission period.

In accordance with one aspect of the embodiment described above, the transmission power to the power reception device is lowered in at least one of the standby period, the placement detection period and the post-full-charge period than in the normal power transmission period.

(7) In the power transmission control device in accordance with still another aspect of the embodiment of the invention, the power transmission driver control section may reduce the transmission power to the power reception device in a temporary power transmission period that is a continuous power transmission period before starting a normal power transmission, after placement of the apparatus including the power reception device has been detected, than in the normal power transmission period.

According to one aspect of the embodiment described above, the transmission power to the power reception device is lowered in the temporary power transmission period that is a continuous power transmission period before the normal power transmission is started than in the normal power transmission period.

(8) In the power transmission control device in accordance with another aspect of the embodiment of the invention, the power transmission driver control section may lower the transmission power to the power reception device, after the normal power transmission is started, in a periodical authentication period that is a period in which the power reception device periodically transmits a foreign object detection signal to the power transmission device, than in the normal power transmission period.

In the periodical authentication period, power supply to a load connected to the power reception device may be stopped (to facilitate detection of the foreign object detection signal on the primary side). In this case, no problem occurs even if the transmission power from the primary side is reduced. Accordingly, in accordance with one aspect of the present embodiment, the transmission power to the power reception device is lowered in the periodical authentication period than the normal power transmission period.

(9) The power transmission control device in accordance with another aspect of the embodiment of the invention may further include a reception processing section that receives feedback information that is sent from the power reception device, wherein the power transmission driver control section variably controls power to be transmitted from the power transmission device to the power reception device based on the feedback information.

In accordance with one aspect of the embodiment described above, the transmission power can be adaptively controlled based on the feedback information that is sent from the power reception device. Accordingly, it is possible to perform adaptive transmission power control that flexibly responds to the state of the power reception device and the like.

(10) In the power transmission control device in accordance with an aspect of the embodiment of the invention, the power transmission driver control section may perform zero-voltage switching of each of the first transistor, the second transistor, the third transistor and the fourth transistor.

By using a zero-voltage switching control for ON/OFF controlling the plurality of switching elements, the switching loss can be further reduced. Therefore, more efficient transmission power control can be achieved.

(11) A power transmission device in accordance with an embodiment of the invention includes: a primary coil, a power transmission driver that drives the primary coil, and any one of the power transmission control device described above.

According to the above, a power transmission device that can efficiently perform transmission power control is realized.

(12) An electronic apparatus in accordance with an embodiment of the invention includes the power transmission device described above.

As the power transmission device in accordance with the embodiment of the invention does not cause wasteful power consumption in the standby period and the like, the electronic apparatus that includes the power transmission device can also effectively reduce power consumption.

(13) A power reception control device in accordance with an embodiment of the invention pertains to a power reception control device that controls operations of a power reception device that receives power transmitted through a primary coil from the power transmission device via a secondary coil and a rectification circuit, and supplies the received power to a load. The power reception control device monitors an output voltage level of the rectification circuit, judges that a foreign object is present between the primary coil and the secondary coil when the output voltage level lowers to a level exceeding an allowable range, and notifies the power transmission device of detection of the foreign object or stops a signal transmission operation to the power transmission device.

By using the power transmission device in accordance with an aspect of the embodiment of the invention described above, the transmission power can be effectively throttled down, such that the transmission power can be reduced close to the minimum necessary level. If the transmission power is weak, and a foreign object is inserted between the primary coil and the secondary coil, the voltage output level of the rectification circuit in the power reception device reduces to an extremely low level exceeding the normal range (i.e., an allowable range). Therefore, the power reception device in accordance with the embodiment described above monitors an output voltage of the rectification circuit in a power reception period (including an intermittent power reception period), and judges that a foreign object is inserted, upon detection of an extremely lowered voltage level. In this case, the power reception device notifies the power transmission device of such detection of the foreign object, or stops a signal transmission operation to the power transmission device. When the operation of signal transmission to the power transmission device is stopped, a time-out error occurs at the time of reception processing on the primary side, such that the power transmission device automatically goes into a standby state. Therefore, consequently, power transmission stoppage corresponding to the foreign object detection at the primary side is realized.

(14) A power reception device in accordance with an embodiment of the invention includes the power reception control device described above.

According to the embodiment described above, a power reception device equipped with the function of subjectively performing detection of foreign object can be realized.

(15) A contactless power transmission system in accordance with an embodiment of the invention includes a primary coil, a secondary coil, the power transmission device described above, and the power reception device described above.

According to the embodiment described above, a contactless power transmission system of high practical value with reduced power consumption can be realized.

(16) In the contactless power transmission system in accordance with an embodiment of the invention, the power transmission control device included in the power transmission device executes transmission power control using phase-shift based on feedback information sent from the power reception device.

According to the embodiment described above, a high performance contactless power transmission system that is capable of adaptively controlling transmission power according to the state of the secondary side can be realized.

BRIEF DESCRIPTION OF THE DRAWINGS

FIGS. 5A-5C are graphs showing examples (actual measurement examples) that compare the efficiency of the power transmission driver when the transmission power control by phase shift is conducted in a contactless power transmission system, and the efficiency of the power transmission driver when the power supply voltage of the power transmission driver is changed.

DESCRIPTION OF EXEMPLARY EMBODIMENTS

First Embodiment

Preferred embodiments of the invention are described in detail below. It is noted that the embodiments described below should not unduly limit the content of the invention recited in the scope of the claimed invention, and all of the compositions to be described in the embodiments may not necessarily be indispensable as means for solution provided by the invention.

Exemplary Composition of Power Transmission Device

Figure 1:
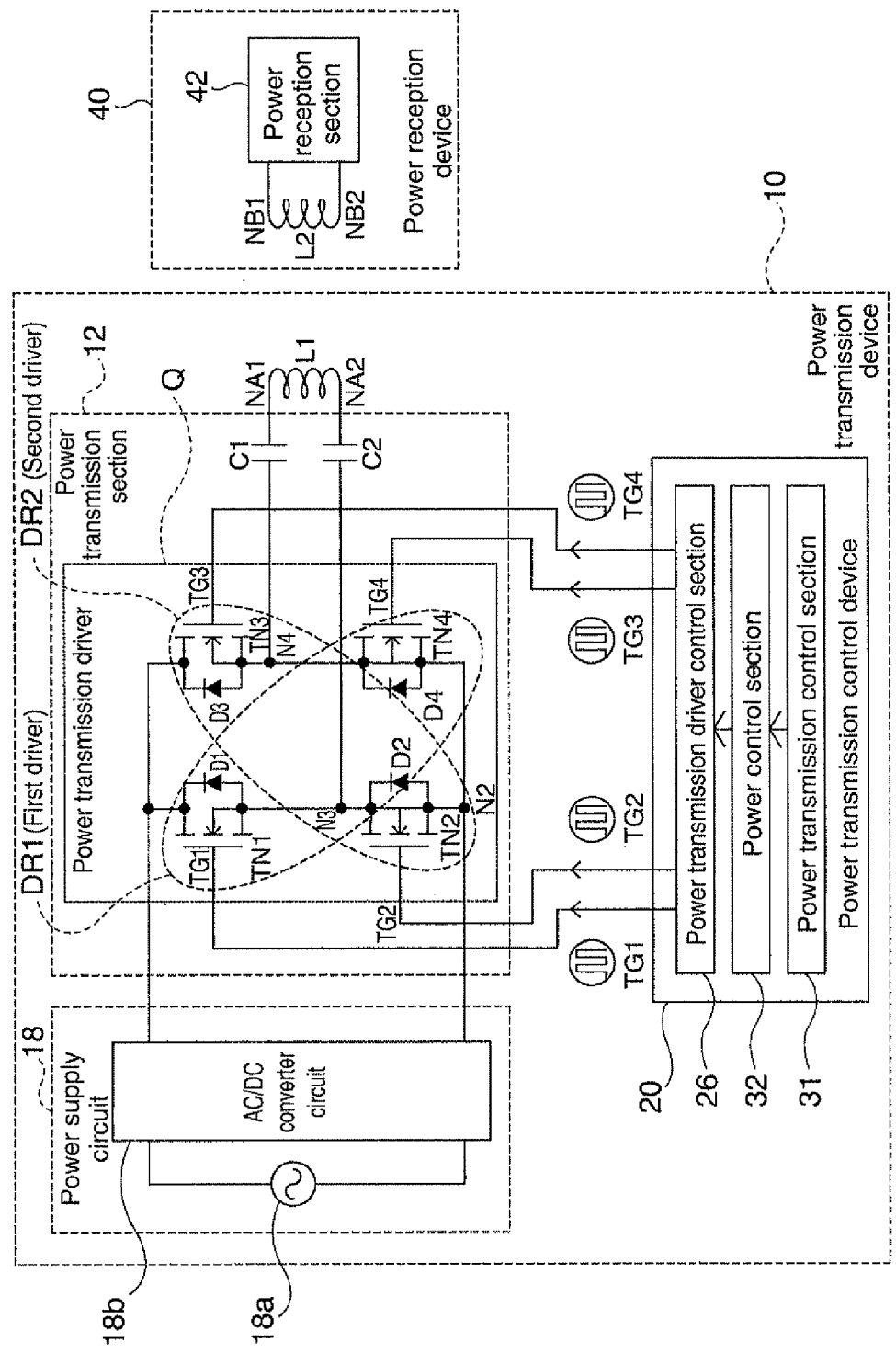
FIG. 1 is a diagram of an exemplary composition of a power transmission device (including a power transmission control device) in accordance with an embodiment of the invention.

FIG. 1 is a diagram showing the composition of a power transmission device in accordance with a first embodiment of the invention, and shows a basic exemplary composition of a power transmission control device in accordance with an embodiment of the invention.

A power transmission device 10 shown in FIG. 1 includes a power supply circuit 18 (having an AC voltage source 18*a* and an AC/DC converter circuit 18*b*), a power transmission section 12, and a primary coil L1. Also, a power reception device 40 includes a secondary coil L2 and a power reception section 42.

The power transmission section 12 includes a power transmission driver Q that drives the primary coil L1 based on a power supply voltage (an operation voltage) outputted from the AC/DC converter circuit 18*b*. The power transmission driver Q has a function as a DC/AC converter circuit that generates an AC drive signal for the primary coil L1. The power transmission driver Q includes a first driver DR1 and a second driver DR2. The first driver DR1 and the second driver DR2 AC-drive the primary coil L1. In other words, the first driver DR1 and the second driver DR2 alternately drive the primary coil L1. Also, the driving direction (i.e., the direction in which the drive current flows) of the primary coil L1 by the second driver DR2 is opposite to the driving direction thereof by the first driver DR1. The primary coil L1 is connected with resonance capacitors C1 and C2. It is noted that one of the resonance capacitors C1 and C2 may be omitted.

The first driver DR1 includes a MOS transistor TN1 as a first switching element that is supplied with a high potential power supply (VDD) that is connected to the high potential power supply in FIG. 1), and a MOS transistor TN4 as a second switching element that is supplied with a low potential power supply (VSS) (i.e., that is connected to the low potential power supply in FIG. 1), wherein the MOS transistors TN1 and TN4 have overlapping ON-periods along their temporal axis. In other words, ON-periods of the MOS transistor TN1 as the first switching element and ON-periods of the MOS transistor TN4 as the second switching element include periods that overlap one another. Further, the MOS transistor TN1 is driven by a drive signal (ON/OFF control signal) TG1, and the MOS transistor TN4 is driven by a drive signal (ON/OFF control signal) TG4.

Similarly, the second driver DR2 includes a MOS transistor TN3 as a first switching element that is supplied with the high potential power supply (VDD) (i.e., that is connected to the high potential power supply in FIG. 1), and a MOS transistor TN2 as a second switching element that is supplied with the low potential power supply (VSS) (i.e., that is connected to the low potential power supply in FIG. 1), wherein the MOS transistors TN3 and TN2 have overlapping ON-periods along their temporal axis. Further, the MOS transistor TN3 is driven by a drive signal (ON/OFF control signal) TG3, and the MOS transistor TN2 is driven by a drive signal (ON/OFF control signal) TG2.

As each of the MOS transistors TN1-TN4 in FIG. 1, an N-type MOS transistor is used, but it is also possible to use a P-type MOS transistor. Further, parasitic diodes (body diodes) D1-D4 are connected between the sources and drains of the MOS transistors TN1-TN4, respectively.

The power transmission control device 20 includes a power transmission driver control section 26, a power control section 32, and a power transmission control section 31. The Power transmission control section 31 generally controls the entire operation of the power transmission device 10. Also, the power control section (a transmission power control section) 32 sets a suitable transmission power level (a transmission power value) according to an operation state of the power transmission device 10, or in consideration of consistency with the power reception device 40, or in response to a request from the power reception device 40.

As described above, if the power supply voltage of the AC/DC converter circuit 18b is reduced for lowering the transmission power, the efficiency at the power transmission driver Q lowers. Therefore, in accordance with the present embodiment, for example, when the transmission power is to be reduced to a level lower than a transmission power in a normal power transmission period, the power transmission driver control section 26 performs transmission power control by a phase-shift control method. With this, the transmission power is adjusted to a power value (a power level) set by the power control section 32.

Specifically, the power transmission driver control section 26 outputs a first drive signal (an ON/OFF control signal, or a switching control signal) TG1 for switching the NMOS transistor TN1 as the first transistor, a second drive signal TG2 for switching the NMOS transistor TN2 as the second transistor, a third drive signal TG3 for switching the NMOS transistor TN3 as the third transistor, and a fourth drive signal TG4 for switching the NMOS transistor TN4 as the fourth transistor, and variably changes a phase shift amount (a phase difference) between the first drive signal TG1 and the fourth drive signal TG2 and a phase shift amount (a phase difference) between the third drive signal TG2 and the fourth drive signal TG3, thereby variably changing the power to be transmitted from the power transmission device 10 to the power reception device 40.

For example, a phase shift amount (a phase difference) of the fourth drive signal TG4 can be variably changed with respect to the first drive signal TG1 (a reference signal) by the first driver DR1 or, conversely, a phase shift amount of the first drive signal TG1 can be variably changed with respect to the fourth drive signal TG4 (a reference signal).

Similarly, a phase shift amount of the second drive signal TG2 can be variably changed with respect to the third drive signal TG3 (a reference signal) or, conversely, a phase shift amount of the third drive signal TG3 can be variably changed with respect to the second drive signal TG2 (a reference signal).

AC drive of Primary Coil by Power Transmission Driver

Figure 2A:
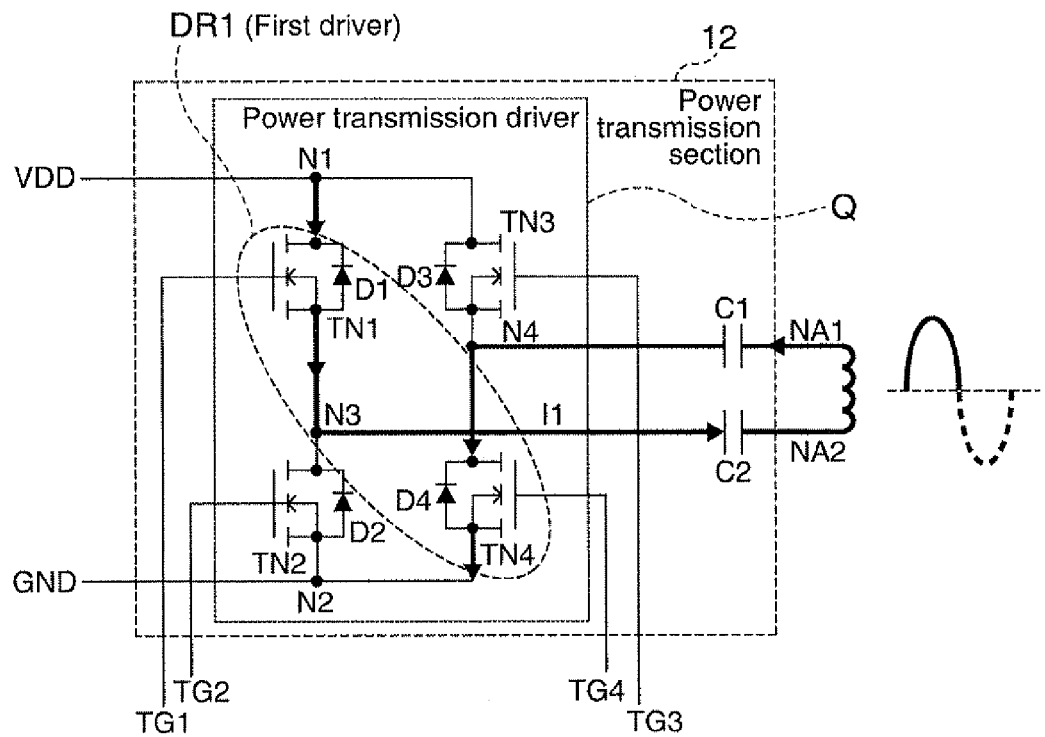
FIGS. 2A and 2B are diagrams for concretely describing an AC driving of a primary coil by a power transmission driver shown in FIG. 1.
Figure 2B:
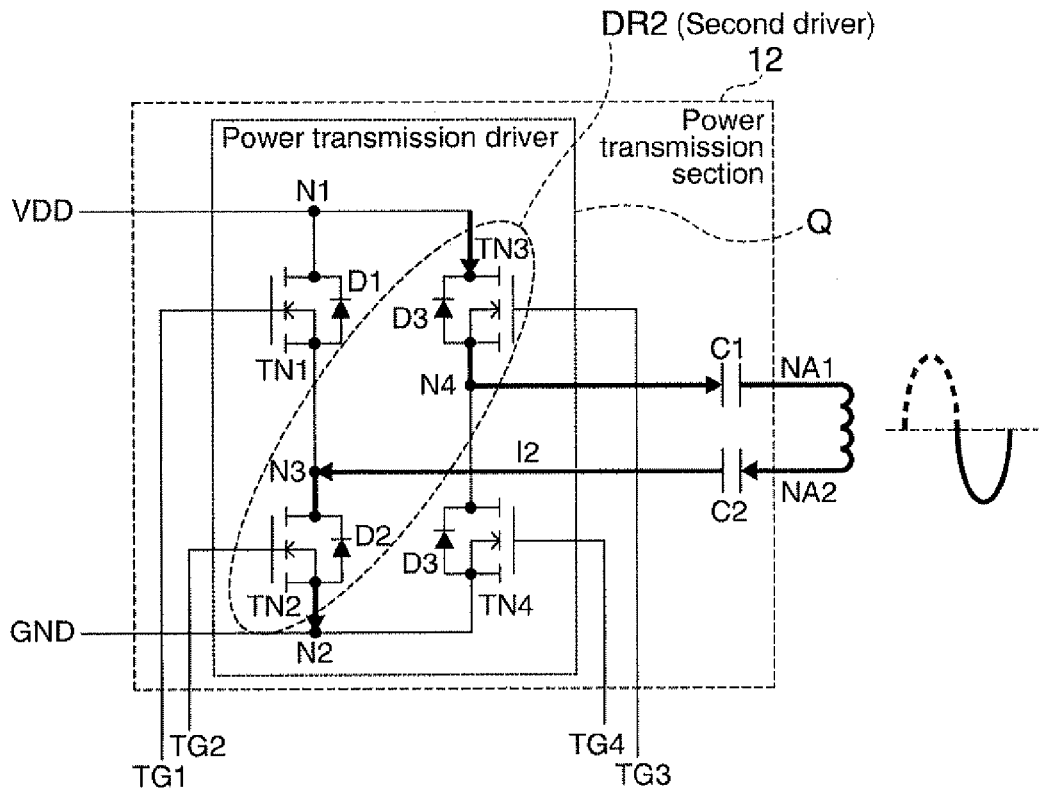

FIGS. 2A and 2B are diagrams for concretely describing the AC driving of the primary coil L1 by the power transmission driver Q shown in FIG. 1. Drive currents are indicated in the figures by thick arrowed solid lines. The first driver DR1 and the second driver DR2 alternately drive the primary coil lA. For example, voltage waveforms at a node NA1 that is one end of the primary coil L1 appear as AC waveforms as shown in the figure.

As shown in FIG. 2A, when the primary coil L1 is driven by the first driver DR1, a drive current I1 flows. Also, as shown in FIG. 2B, when the primary coil L1 is driven by the second driver DR2, a drive current I2 flows (in a current direction opposite to that of the drive current I1).

Transmission Power Control by Phase-Shift Control Method

Figure 3A:
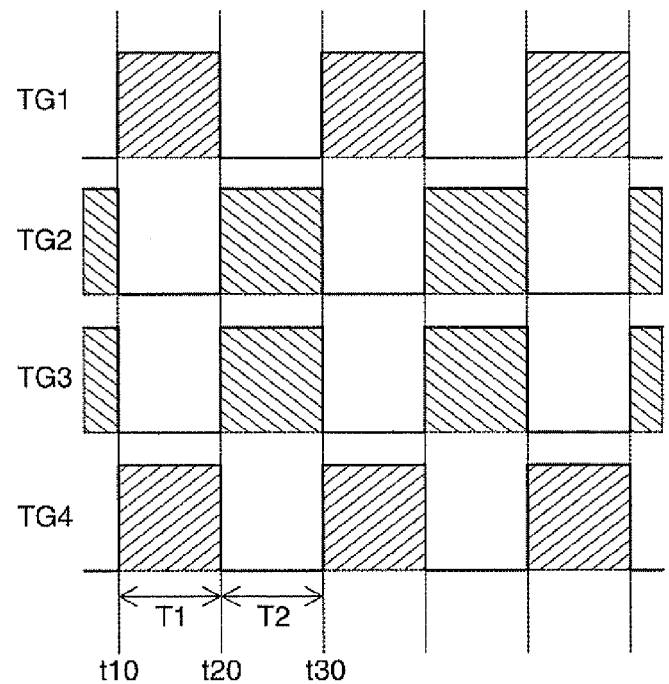
FIGS. 3A and 3B are timing charts of drive signals (ON/OFF control signals) for switching elements included in the power transmission driver shown in FIG. 2.
Figure 3B:
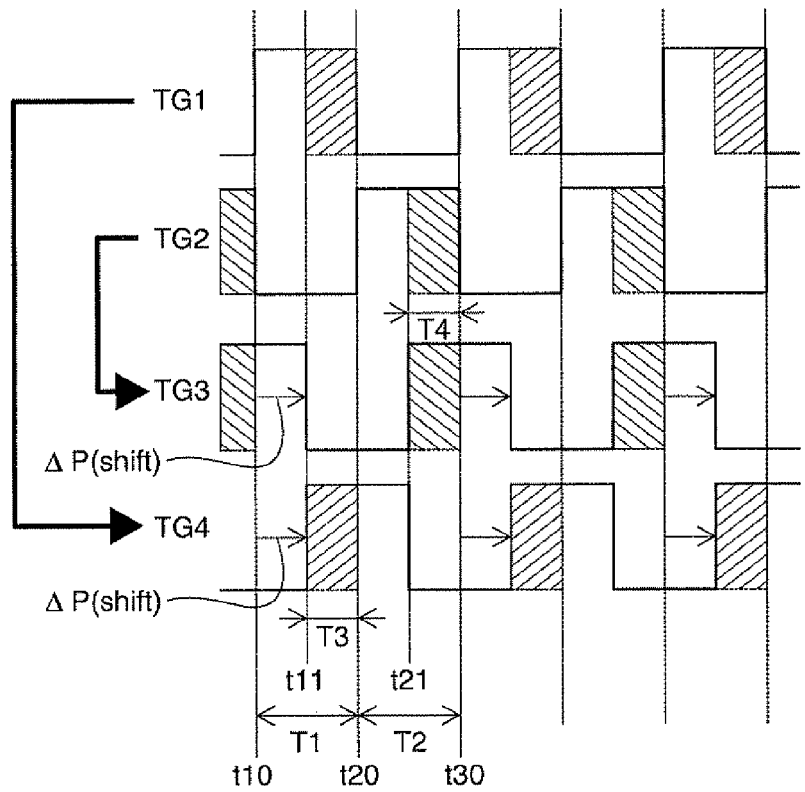

FIGS. 3A and 3B are timing charts of drive signals (ON/OFF control signals or switching control signals) of each of the switching elements including in the power transmission drivers shown in FIG. 2.

As described above, the timing of each of the first drive signal TG1 through the fourth drive signal TG4 is independently controlled by the power transmission driver control section 26. For example, each of the first drive signal TG1 through the fourth drive signal TG4 has the same cycle (T), but their phases are independently controlled. FIG. 3A shows the first drive signal TG1 and the fourth drive signal TG4 (and the second drive signal TG2 and the third drive signal TG4) in which their duty is 100%, and FIG. 3B shows them in which their duty is 50%.

The term "duty" used here refers to the proportion of periods in which the primary coil L1 is energized during a period in which the primary coil L1 is driven in positive polarity (or a period in which it is driven in negative polarity). The energization period of the primary coil L1 is a period in which an ON-period of the first switching element TN1 (or TN3) on the high potential power supply side and an ON-period of the second switching element TN4 (or TN2) on the low potential power supply side included in the first driver DR1 (or the second driver DR2) overlap each other.

For example, in the case shown in FIG. 3A, the drive period in positive polarity is a period T1 (=T/2, time t10-t20), and the drive period in negative polarity is a period T2 (=T/2, time t20-t30). In the case shown in FIG. 3A, the phase of the first drive signal TG1 and the phase of the fourth drive signal TG4 coincide with each other (in other words, their periods of H level and their periods of L level coincide), and therefore the energization period of the primary coil L1 in the drive period in positive polarity T1 is T1. Similarly, the phase of the second drive signal TG2 and the phase of the third drive signal TG3 coincide with each other (in other words, their periods of H level and their periods of L level coincide), and therefore the energization period of the primary coil L1 in the drive period in negative polarity T2 is T2. In other words, as the drive period in each polarity coincides with the actual energization period, driving with a duty of 100% is achieved.

On the other hand, in the case shown in FIG. 3B, a phase shift of 90 degrees is set between the first drive signal TG1 and the fourth drive signal TG4. Similarly, a phase shift (a phase shift amount) of 90 degrees is set between the second drive signal TG2 and the third drive signal TG3. In other words, in FIG. 2B, the phase shift ΔP (sift) of the fourth drive signal TG4 with respect to the first drive signal TG1 is set at 90° and, similarly, the phase shift ΔP (sift) of the third drive signal TG3 with respect to the second drive signal TG1 is set at 90°.

Therefore, the energization period of the primary coil L1 in the drive period in positive polarity T1 is a period T3 (=T1/2), and the energization period of the primary coil L1 in the drive period in negative polarity T2 is a period T4 (=T2/2). In other words, the energization period of the primary coil L1 in FIG. 3B is a half of the energization period in FIG. 3A. Accordingly, driving with a duty of 50% is achieved. Consequently, when the phase shift control shown in FIG. 3B is performed, the transmission power is reduced by half, compared to the case shown in FIG. 3A. By variably changing the phase shift (i.e., the phase shift amount) ΔP (sift), the transmission power can be continuously, freely adjusted (for example, in the range of duty between 1% and 100%, excluding a duty of 0%).

Second Embodiment

In this embodiment, detailed description will be made as to examples of reducing transmission power by the phase shift control compared to that at the time of a normal power transmission (in a case where a normal load such as a battery is charged). In order to enable contactless power transmission systems to be widely used as a social infrastructure, power saving is essential. A contactless power transmission system may have a variety of operation phases other than a normal power transmission phase, which tends to cause an increased waste in transmission power. For example, in order to sufficiently reduce power consumption of a contactless power transmission system, it is important to reduce its power consumption as much as possible during a standby period or a temporary power transmission (which is a continuous power transmission temporarily executed prior to the normal power transmission) period before the normal power transmission, or in a recharging management period after the battery has been fully charged. According to the phase shift control, in the period in which the transmission power can be controlled, a reduction of the actual transmission power, for example, to a minimum necessary level, can be readily realized, and therefore the power saving of the contactless power transmission system can be realized without any undue difficulty.

Figure 4:
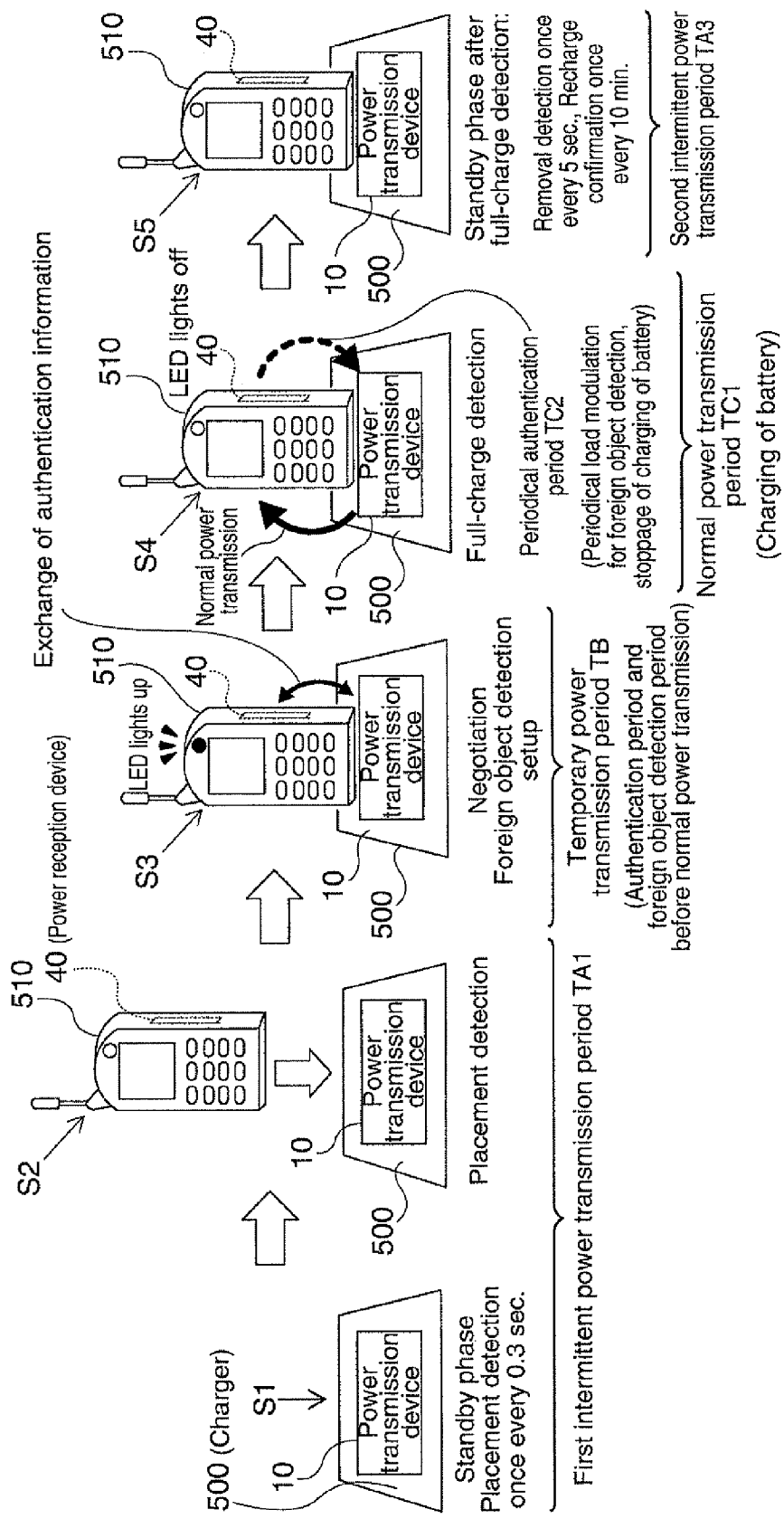
FIG. 4 is an illustration showing an example of an effective period to reduce transmission power by phase shift in an operation period of a contactless power transmission system.

FIG. 4 is an illustration showing an example of periods in which a reduction of transmission power by phase shift in an operation period of the contactless power transmission system is effective. First, an example of a normal operation of the contactless power transmission system will be described.

An intermittent power transmission period TA1 in FIG. 4 is a period corresponding to a standby phase (a standby state). In the standby phase, the power transmission device 10 built in a charger (a cradle) 500, which is an electronic device on the power transmission side, detects placement (setting) of an electronic device on the power reception side (for example, a portable telephone) 510, for example, once every 0.3 seconds (step S1), thereby detecting placement (setting) of the device on the power reception side 510 (step S2). The power transmission device 10 intermittently drives the primary coil L1 to enable the placement detection. For example, the primary coil L1 may be driven for only 5 milliseconds at each 0.3 seconds.

When placement of the power reception side device is detected, exchange (negotiation and setup) of a variety of information is executed between the power transmission device 10 and the power reception device 40 (step S3). In a negotiation phase, authentication information (including ID information) is exchanged and, for example, a matching confirmation processing to confirm matching in standard, coil and system is executed based on the received ID information and the like. Also, in the negotiation phase, information on safety issues (for example, detection parameters for detection of a foreign object and the like) is exchanged. The operation of exchanging these information is executed in a temporary power transmission period TB in FIG. 4 (more specifically, in an authentication period and in a foreign object detection period prior to the normal power transmission).

Specifically, in the temporary power transmission period TB, the power transmission device 10 executes temporary power transmission. The temporary power transmission is a continuous power transmission that is temporarily executed for enabling the information exchange and the like before the normal power transmission. The power transmission side and the power reception side exchange authentication information such as ID information, and confirm if their standard, coil, system and the like match with each other based on the received authentication information (ID information and the like). Also, the power reception side may transmit safety threshold value information for detection of a foreign object or the like to the power transmission side, thereby exchanging information on safety issues. This negotiation processing confirms as to whether or not communication of information between the power transmission side and the power reception side is possible, confirms as to whether or not the communicated information is adequate, and confirms as to whether or not a load state on the power reception side is appropriate (if a foreign object is not detected). In the negotiation processing, as a result of the exchange of authentication information (ID information and the like), if it is judged that any of the standard, the coil, the system and the like does not match, or a timeout error occurs, the power transmission device 10 proceeds to a standby phase, for example.

After the negotiation phase, the contactless power transmission system proceeds to a setup phase. In the setup phase, a setup processing is executed in which setup information such as information on compatible functions, application-dependent setting information and the like is transmitted. For example, based on a result of the negotiation processing, transmission conditions are specified. More specifically, when the power reception side transmits transmission condition information on the drive voltage of the coil, the drive frequency and the like to the power transmission side, the power transmission side sets transmission conditions for the normal power transmission, such as, the drive voltage of the coil, the drive frequency and the like, based on the received transmission condition information. Also, exchange of information about compatible functions and exchange of setting information that differs from one upper-layer application to another are performed in the setup processing. More specifically, threshold value information for detection of a load state on the power reception side after the start of normal power transmission (for example, threshold value information for data communication and foreign object detection), and information in a command phase after the normal power transmission about types of commands that the power transmission side and the power reception side can issue and execute, communication functions, additional compatible functions such as periodical authentication functions and the like are exchanged in this setup processing. This processing makes it possible to exchange setting information on the type of each electronic apparatus (e.g., a portable telephone, an audio equipment or the like) and its model which are different from one application to another. In the setup processing, if it is detected that the apparatus is removed, or a timeout error occurs, the processing sequence proceeds to the standby phase.

In this manner, upon confirming that the power reception device 40 is a proper target for power transmission, and upon setting necessary information, through the negotiation processing and the setup processing (these processings mean to be processings to confirm (in other words, to authenticate) the adaptability of the partner side based on the exchanged information, and therefore these processings may be collectively referred to as an authentication processing in a broad sense), a normal power transmission (which can be a continuous power transmission for charging to a load such as a battery or the like) is started (step S4). In a normal power transmission period TC1 (a battery charging period), the power transmission device 10 executes continuous power transmission at a power level necessary for charging the battery. When the normal power transmission starts, an LED provided on the electronic apparatus (i.e., a portable telephone) 510 on the power reception side lights up.

Also, in the normal power transmission period TC1, upon detection of the full charge state of the battery, a notification of the full charge state is transmitted from the power reception device 40 to the power transmission device 10; and upon receiving the notification, the power transmission device 10 stops the normal power transmission. When the normal power transmission is stopped, the LED provided on the electronic apparatus (a portable telephone) 510 on the power reception side lights out. Then, the processing sequence proceeds to a standby phase after the full-charge state has been detected (step S5).

A second intermittent power transmission period TA3 in FIG. 4 is a period corresponding to the standby phase after the full-charge state has been detected. In the second intermittent power transmission period TA3, removal detection is executed once every five seconds, and confirmation of the necessity for recharging is executed once every ten minutes. When the electronic apparatus (a portable telephone) 510 on the power reception side is removed after the battery has been fully charged, the processing sequence returns to the initial standby phase. Further, when it is judged that recharging is required after the full charge, the processing sequence returns to step S3. In the state in step S3, if removal of the electronic apparatus (a portable telephone) 510 on the power reception side is detected. The processing sequence returns to the initial standby phase.

In the first intermittent power transmission period TA1, the temporary power transmission period TB and the second intermittent power transmission period TA3, the transmission power is set lower than that in the normal power transmission period. Accordingly, in at least one of these periods (preferably in all of the periods), the transmission power control by phase-shift can be executed.

Also, the transmission power control by phase-shift can be executed in a periodical authentication period in the normal power transmission period TC1. The periodical authentication operation is executed for detection of foreign object in the normal power transmission period. Specifically, the power reception device 40 periodically (cyclically, intermittently) transmits a signal in a predetermined pattern to the power transmission device 10. Then, if the power transmission device 10 cannot receive the signal in a predetermined pattern, it is judged that a foreign object is inserted between the primary coil L1 and the secondary coil L2, the normal power transmission is stopped. Transmission of the signal in a predetermined pattern by the power reception device 40 may be executed by, for example, switching a load modulation transistor to change the load of the power reception device 40.

In the period in which the load modulation is executed (in the periodical authentication period), if charging to the battery is continued, detection by the power transmission device 10 of the load modulation signal from the secondary side may be difficult. Therefore, in the periodical authentication period, charging to the battery (a load: which may be referred to as a main load to be distinguished from the load of the power reception device) may preferably be stopped. If the charging to the battery (a main load) is stopped during the periodical authentication period, the transmission power from the primary side may be at a minimum power level that would be only sufficient for the secondary side to perform the load modulation. Accordingly, in the periodical authentication period (the foreign object detection period in the normal power transmission period, the load modulation period), the power transmission device 10 can reduce the transmission power as low as possible by the phase shift control. In this case, the effect of the transmission power control is further enhanced.

FIGS. 5A-5C are graphs showing examples (actual measurement examples) that compare the efficiency of the power transmission driver when the transmission power control by phase shift is conducted in a contactless power transmission system, and the efficiency of the power transmission driver when the power supply voltage of the power transmission driver is changed. FIG. 5A is a graph showing the relation between load current and electrical power on the primary side in the case of using an input voltage variable method (a method of related art) and in the case of using the phase shift control method. FIG. 5B is a graph showing the relation between load current and electrical power on the secondary side, and FIG. 5C is a graph showing the power transmission efficiency in the contactless power transmission system, in the aforementioned cases. It is clear from FIG. 5A that the power consumption on the primary side can be reduced by utilizing the phase shift control method. As shown in FIG. 5B, the power consumption on the secondary side does not change as it does not depend on the power control method on the primary side. The power transmission efficiency (=the primary side power/the secondary side power) in the contactless power transmission system is higher in the case that uses the phase shift control, as shown in FIG. 5C.

Second Embodiment

Figure 6:
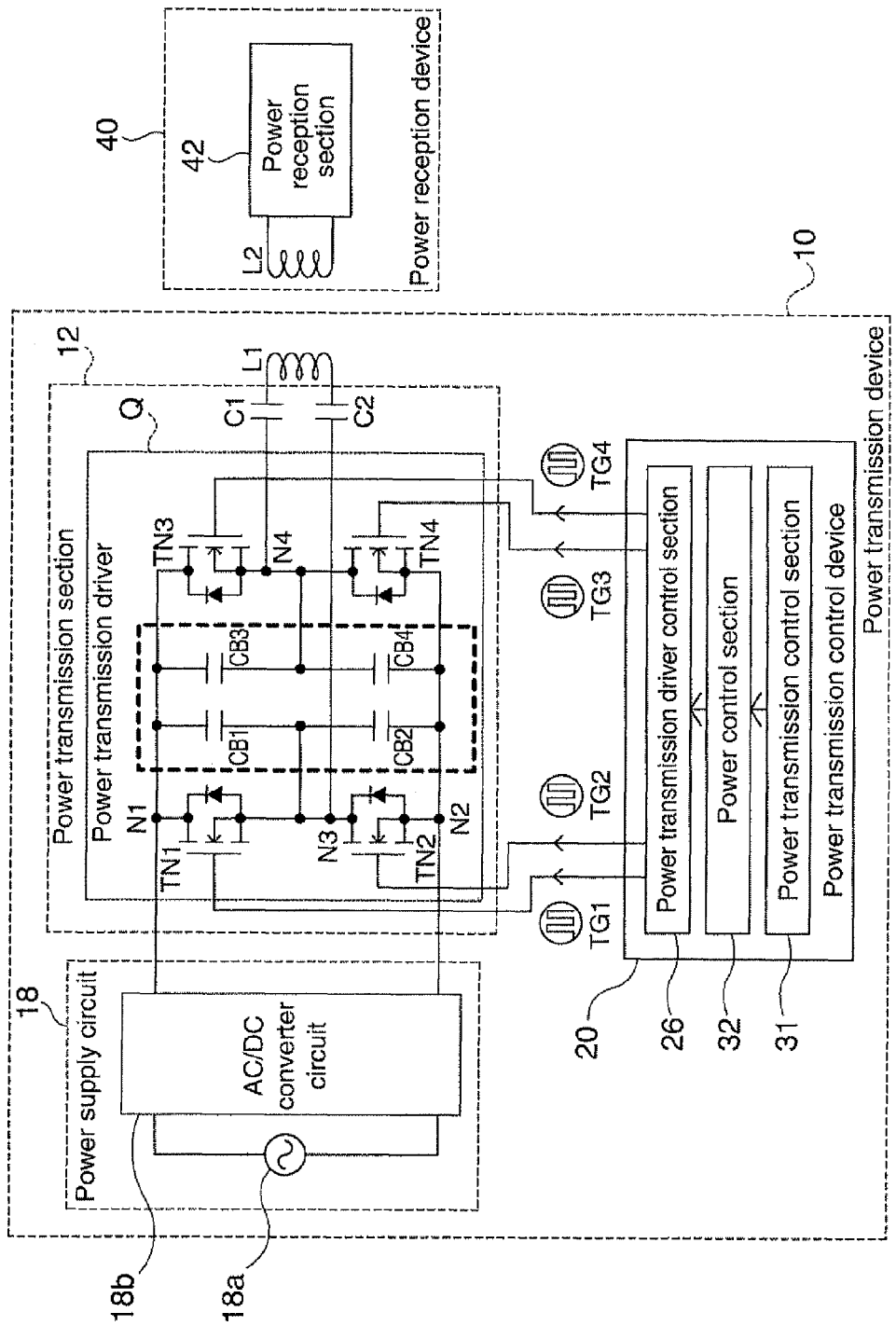
FIG. 6 is a diagram showing another example of a power transmission device (including a power transmission control device) in accordance with an embodiment of the invention (an example in which zero-voltage switching is performed).

FIG. 6 is a diagram showing another example of a power transmission device (including a power transmission control device) in accordance with an embodiment of the invention (an example in which zero-voltage switching is performed). The power transmission device 10 in accordance with the present embodiment is provided with, in addition to the circuit composition shown in FIG. 1, capacitors for zero-voltage switching (adjustment capacitors) CB1-CB4 (the capacitors are encircled by a thick dotted line in FIG. 6).

The zero-voltage switching capacitors (adjustment capacitors) CB1 and CB2 and the zero-voltage switching capacitors CB3 and CB4 are connected in series between the high potential power supply and the low potential power supply, respectively. A common connection node of the CB1 and the CB2 is connected to a common connection node N3 between the first transistor TN1 and the second transistor TN2. A common connection node of the CB3 and the CB4 is connected to a common connection node N4 between the third transistor TN3 and the fourth transistor TN4.

Figure 7A:
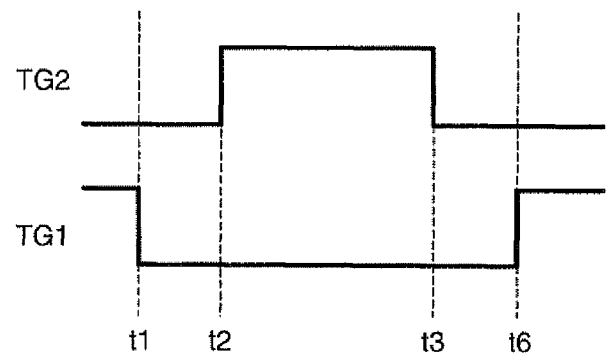
FIGS. 7A-7C are charts for describing the effect of zero-voltage switching.
Figure 7B:
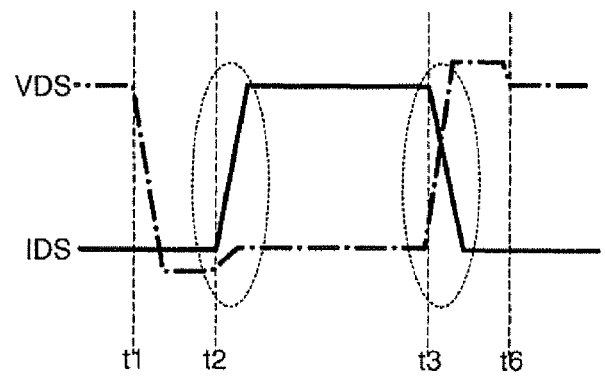
Figure 7C:
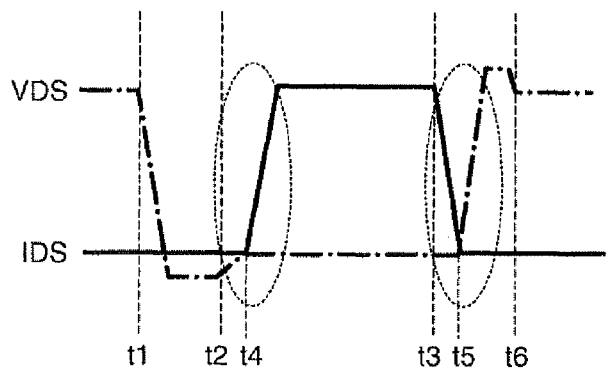

FIGS. 7A-7C are charts for describing the effect of zero-voltage switching. Voltage levels of the first drive signal TG1 and the second drive signal TG2 (see FIGS. 1-3) change in a manner shown in FIG. 7A. Specifically, the second drive signal TG2 changes from Low to High at time t2 and changes from High to Low at time t3. Also, the first drive signal TG1 changes from High to Low at time t2 and changes from Low to High at time t6.

FIG. 7B shows an example of operations when zero-voltage capacitors are not provided, and FIG. 7C shows an example of operations when zero-voltage capacitors are provided. Specifically, each of FIGS. 7B and 7C shows changes in a source-to-drain voltage VDS and a source-to-drain current IDS in the second NMOS transistor TN2 (or the third NMOS transistor TN3), when the first drive signal TG1 and the second drive signal TG2 change in a manner shown in FIG. 7A.

When the zero-voltage switching capacitors CB1-CB4 are not provided, switching loss is generated in the period between time t1 and time t2 and in the period between time t3 and time t6, as shown in FIG. 7B. In contrast, when the zero-voltage switching capacitors CB1-CB4 are provided, the current (IDS) or the voltage (VDS) becomes zero, in the period between time t2 and time t4 and in the period between time t3 and time t5, as shown in FIG. 7C, such that almost no switching loss occurs. Therefore, a reduction in the efficiency of the power transmission driver Q (for example, the efficiency of DC to AC conversion) can be further reduced.

Third Embodiment

Figure 8:
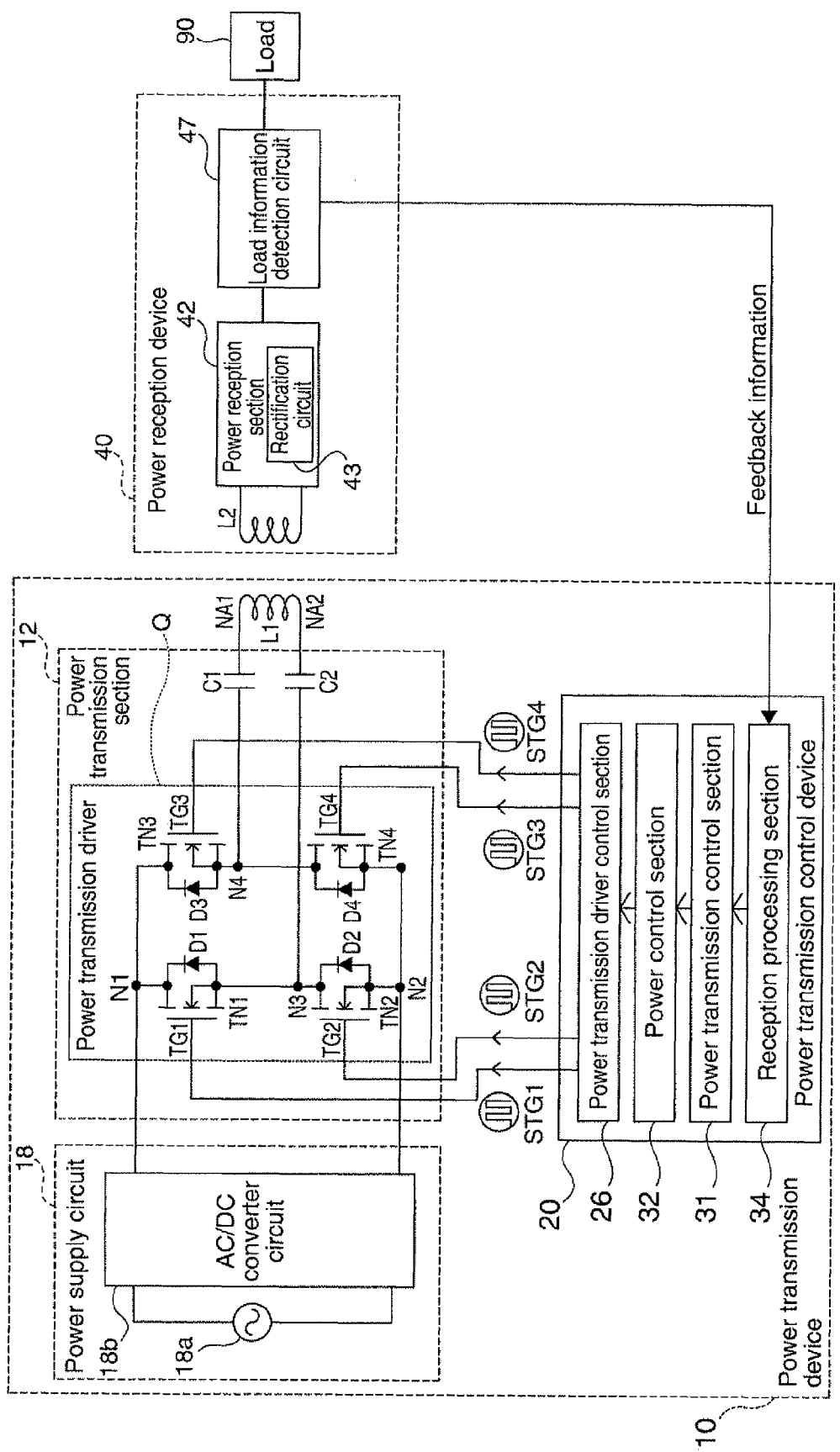
FIG. 8 is a diagram showing an example of a contactless power transmission system in accordance with an embodiment of the invention (an example in which information is fed back from the power reception device side to the power transmission device side).

FIG. 8 is a diagram showing an example of a contactless power transmission system in accordance with an embodiment of the invention (an example in which information is fed back from the power reception device side to the power transmission device side). In accordance with the present embodiment, the power reception device 40 transmits feedback information to the power transmission device 10, and the power transmission device 10 adaptively changes the transmission power based on the received feedback information.

In FIG. 8, the power reception device 40 further includes a load information detection circuit 47 for detecting load information of the load 90. The power reception device 40 transmits load information as feedback information to the primary side through normal communication from the secondary side coil L2 to the primary side coil L1 by a load modulation.

On the other hand, the power transmission control device 20 includes a reception processing section 34 that receives power reception side feedback information from the power reception device 40, and a power transmission control section 31 that generates a variety of control signals for transmission power control based on the feedback information. The power control section (the transmission power control section) 32 sets an optimum transmission power level (transmission power value) based on the control signal from the power transmission control section 31. The power transmission driver control section 26 individually controls the timings of the first drive signal through the fourth drive signal, thereby realizing a phase shift control corresponding to the set power transmission value.

In accordance with the present embodiment, based on the feedback information sent from the power reception side, a phase shift amount for obtaining an optimum load value that brings about the maximum power transmission efficiency is set, and power transmission control can be performed based on the phase shift amount, such that reasonable and adaptable power transmission corresponding to the power reception side feedback information can be realized.

As the feedback information, information that serves as an index to assume (specify) a load state can be used and, for example, a charge current value and a charge voltage value to the load (the main load: the battery and other circuits) 90, a power consumption amount by the load 90 and the like may be used. The load state also changes depending on the ambient temperature, such that temperature information may also be used as feedback information. Moreover, a phase shift amount required for realizing an optimum transmission power may be calculated on the secondary side, and phase shift data obtained by the calculation may be fed back to the power transmission device 10. In this case, calculation of a phase shift amount on the primary side is made unnecessary, and therefore the adaptable control of transmission power can be performed at higher speed. Also, load value data may be calculated by a predetermined calculation procedure on the secondary side, and the load value data may be fed back to the primary side.

Fourth Embodiment

Figure 9:
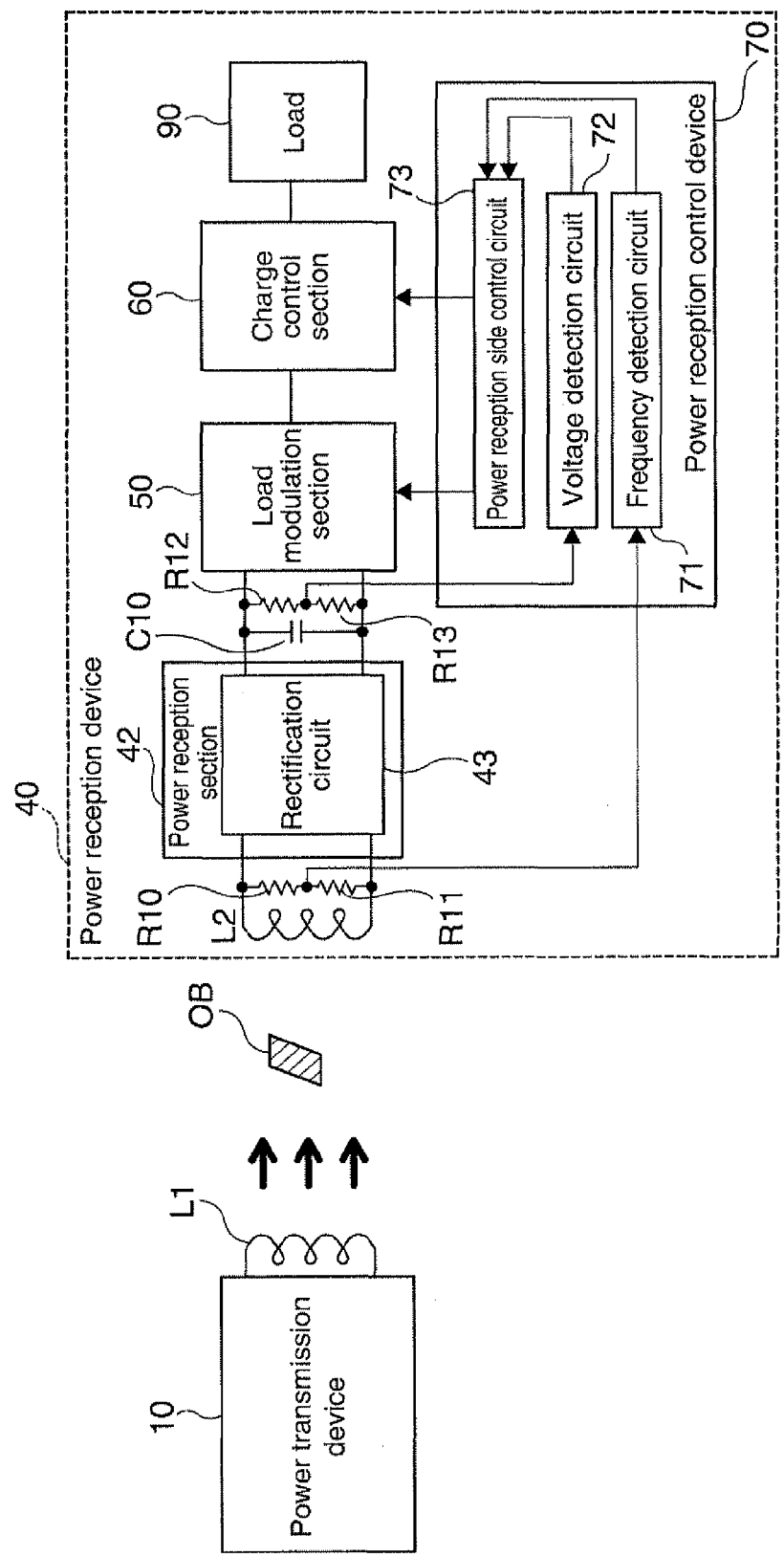
FIG. 9 is a diagram showing an example of a power reception device (including a power reception control device) that monitors an output voltage of a rectification circuit for detection of a foreign object in a period in which weak power transmission is performed (i.e., in an intermittent power transmission period and the like).

In this embodiment, a novel foreign object detection method that can be used in the intermittent power transmission period and the like will be described. Specifically, by using the power transmission technology for transmitting weak power by the phase shift control method and the like, a novel foreign object detection method can also be realized. FIG. 9 is a diagram showing an example of a power reception device (including a power reception control device) that monitors an output voltage of a rectification circuit for detection of a foreign object in a period in which weak power transmission is performed (i.e., in an intermittent power transmission period and the like).

The power reception device 40 shown in FIG. 9 includes a rectification circuit 43 provided in the power reception section 42, a load modulation section 50, a charge control section 60, and a load (a main load) 90. The power reception control device 70 includes a frequency detection circuit 71, a voltage detection circuit 72, and a power reception side control circuit 73. The frequency detection circuit 71 is a circuit that detects a frequency of a signal that is sent from the power transmission device 10 by frequency modulation. A voltage signal obtained from a common connection point between a resistance R10 and a resistance R11 serially connected between both ends of the secondary coil L7 is inputted in the frequency detection circuit 71.

The voltage detection circuit 72 monitors a voltage level of a DC voltage that is obtained by smoothing an output voltage of the rectification circuit (rectification bridge) 43 by a smoothing capacitor C10. A voltage-divided voltage obtained by voltage-dividing the DC voltage by a resistance R11 and a resistance R12 is inputted in the voltage detection circuit 72. The power reception side control circuit 73 generally controls operations of the power reception device 40.

As described above, by using the power transmission device 10 in accordance with the invention, the transmission power can be effectively reduced, such that the transmission power can be reduced close to the minimum necessary level. When the transmission power is somewhat strong, and a foreign object OB is interposed between the primary coil L1 and the secondary coil L2, and for example, when the foreign object OB is not that big (in other words, when only a fraction of the transmission power is consumed by the foreign object OB), a reduction in the voltage level of an output voltage of the rectification circuit on the power reception side is small, and it may not be possible to judge as to whether such voltage reduction is caused by an inserted foreign object or whether such voltage reduction is caused by a minute positional deviation. In contrast, when the transmission power is weak, and when a foreign object OB is present between the primary coil L1 and the secondary coil L2, the voltage output level of the rectification circuit 46 on the power reception device 40 extremely lowers exceeding a normal range (exceeding an allowable range).

Therefore, the voltage detection circuit 72 in the power reception device 40 in accordance with the present embodiment monitors the voltage level of an output voltage of the rectification circuit 43 during a power reception period (including an intermittent power reception period). Upon detection of an extreme reduction in the voltage level (or when the voltage level becomes almost zero), the voltage detection circuit 72 judges that a foreign object OB is present. It is noted that the judgment of a reduction in the voltage level by the voltage detection circuit 72 can be made by, for example, comparison between a measured voltage value and a predetermined threshold voltage value. Then, the power transmission device 10 is notified of the detection of a foreign object, and/or an operation of signal transmission to the power transmission device 10 (a signal transmission operation to be executed unless no foreign object is inserted) may be stopped. When the operation of signal transmission to the power transmission device 10 is stopped, a timeout error occurs at the time of reception processing on the primary side, such that the power transmission device 10 automatically proceeds to a standby state. As a result, the power transmission is stopped on the primary side in response to the foreign object detection.

Figure 10:
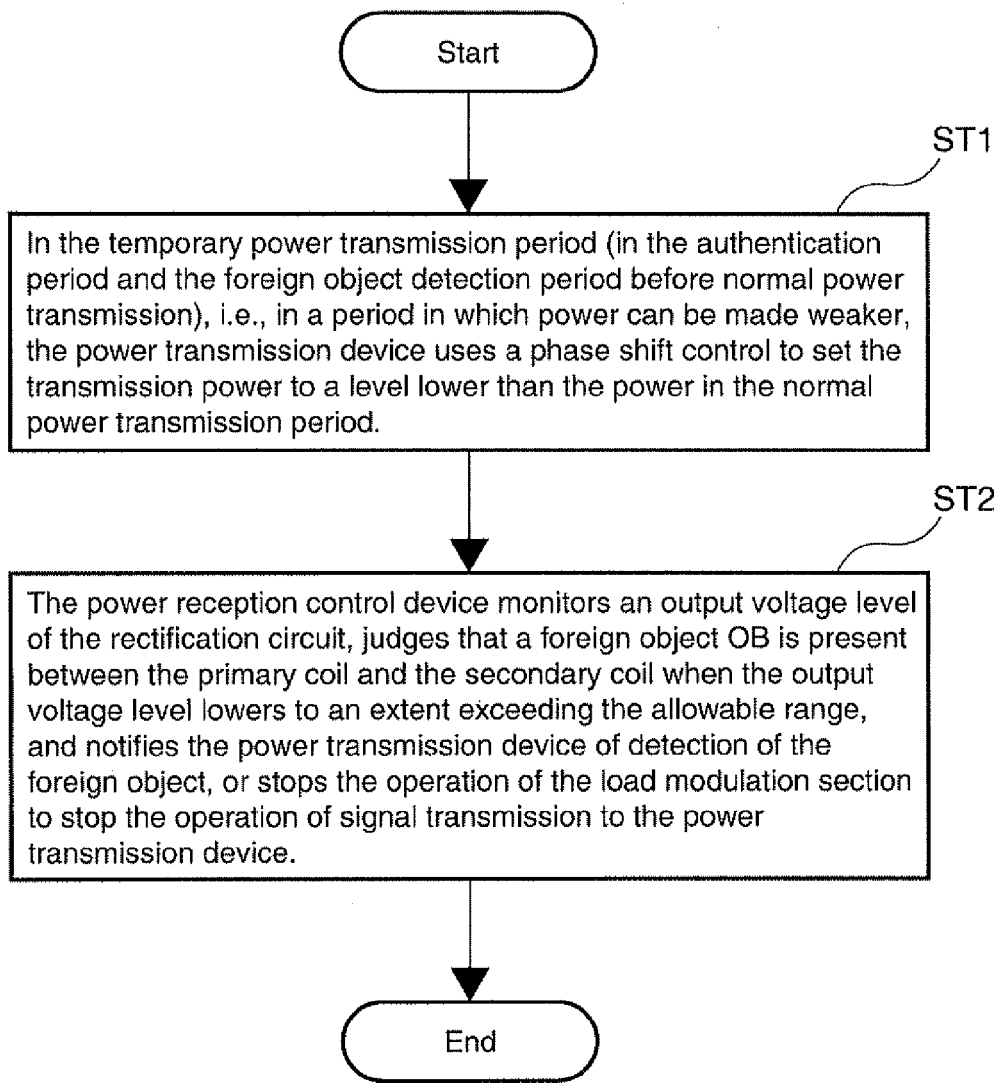
FIG. 10 is a flow chart showing main operations for detection of a foreign object at the power reception device (including a power reception control device) shown in FIG. 9.

FIG. 10 is a flow chart showing main operations for detection of a foreign object at the power reception device (including the power reception control device) shown in FIG. 9. As shown in the flow chart, in step 1 (ST1), in the temporary power transmission period (in the authentication period and the foreign object detection period before the normal power transmission) and the like, the power transmission device 10 uses the phase shift control to set the transmission power to a level lower than the power in the normal power transmission period. Next, in step 2 (ST2), the power reception control device 70 monitors an output voltage level of the rectification circuit 43, judges that a foreign object OB is present between the primary coil L1 and the secondary coil L2 when the output voltage level lowers to an extent exceeding the allowable range, and notifies the power transmission device 10 of detection of the foreign object OB, or stops the operation of the load modulation section 50 to stop the operation of signal transmission to the power transmission device 10.

In this manner, in accordance with the present embodiment, foreign object detection can be performed on the power reception device side. It is noted that the phase shift control may preferably be used when transmitting weak power, but other methods may also be used for transmitting weak power without any particular limitation to the above-described embodiment.

Fifth Embodiment

Figure 11A:
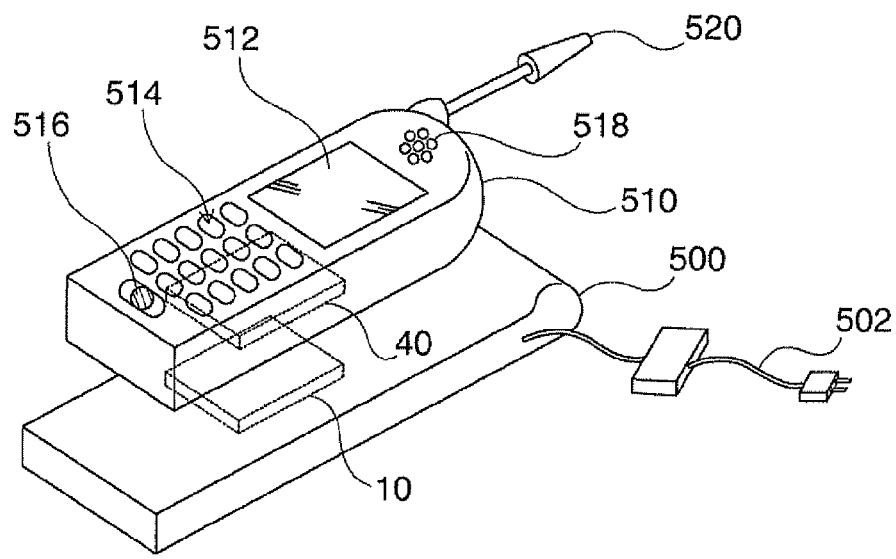
FIGS. 11A-11C are illustrations of an example of an electronic apparatus including the power transmission device and an example of an electronic apparatus including the power reception device.
Figure 11B:
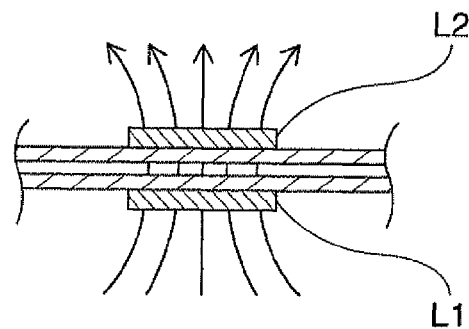
Figure 11C:
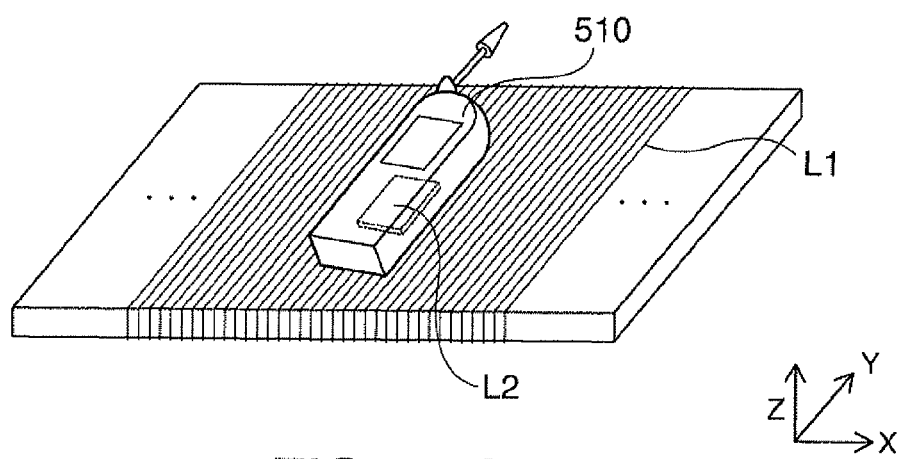

FIGS. 11A-11C are illustrations of an example of an electronic apparatus including the power transmission device and an example of an electronic apparatus including the power reception device. As shown in FIG. 11A, a charger 500 (a cradle) that is one of electronic apparatuses includes a power transmission device 10. A portable telephone 510 that is one of electronic apparatuses includes a power reception device 40. The portable telephone 510 includes a display section 512 such as an LCD, an operation section 514 composed of buttons and the like, a microphone 516 (a voice input section), a speaker 518 (a voice output section), and an antenna 520.

Power is supplied to the charger 500 through an AC adapter 502, and the power is transmitted from the power transmission device 10 to the power reception device 40 by contactless power transmission. Accordingly, a battery of the portable telephone 510 can be charged and devices in the portable telephone 510 can be operated.

The electronic apparatus according to the embodiment is not limited to the portable telephone 510. For example, the embodiment is applicable to various electronic apparatuses such as watches, cordless phones, shavers, electric toothbrushes, wrist computers, handheld terminals, personal digital assistants, electric bicycles, and IC cards.

As schematically shown in FIG. 11B, power is transmitted from the power transmission device 10 to the power reception device 40 by electromagnetically coupling a primary coil L1 (a power transmission coil) provided on the power transmission device 10 side and a secondary coil L2 (a power receiving coil) provided on the power reception device 40 side thereby forming a power transmission transformer. This structure enables contactless power transmission to be performed.

In FIG. 11B, the primary coil L1 and the secondary coil L2 form, for example, a flat coil having an air-core formed by winding a coil wire in a spiral manner on a plane. However, the coil of the embodiment may be in any shape and structure without any particular limitation to the above, as long as the coil can be used to transmit power by electromagnetically coupling the primary coil L1 and the secondary coil L2.

For example, referring to FIG. 11C, the primary coil L1 is formed by winding a coil wire in a spiral manner about an X axis of a magnetic substance core. The secondary coil L2 provided in the portable telephone 510 is similarly formed. The embodiment is also applicable to the coil shown in FIG. 11C. In the case shown in FIG. 11C, as the primary coil L1 and the secondary coil L2, a coil formed by winding a coil wire about a Y axis may be combined, in addition to the coil formed by winding the coil wire about the X axis.

As described above, in accordance with some embodiments of the invention, for example, transmission power can be freely adjusted while maintaining the DC/AC conversion efficiency of the power transmission driver at a high level.

Furthermore, as the power control can be performed through variably changing the duty by phase shift, the output of the power supply circuit (the AC/DC converter circuit) does not need to be changed, and the existing AC adapter can be used.

Also, for example, during a period in which the transmission power level can be low, the transmission power can be sufficiently reduced, whereby favorable power saving for the system can be realized. Also, for example, in accordance with an embodiment of the invention, it is possible to provide a transmission power varying technology of highly practical value that can also be used for a novel foreign object detection system. More specifically, power control on the primary side is performed by the phase shift method before the start of normal power transmission, and during an intermittent power transmission period (a standby period, placement detection, a recharging confirmation period after full-charge and the like), whereby lower power consumption can be achieved.

Also, according to the present embodiments of the invention, power information on the secondary side is fed back to the primary side, and the phase shift amount is controlled based on the feedback information, whereby simple, highly efficient and adaptable power control can be performed.

Moreover, for example, it is possible to provide a transmission power varying technology of highly practical value that can also be used for a novel foreign object detection system (a system in which the power reception device performs foreign object detection).

It is noted that, although some embodiments of the invention have been described in detail above, those skilled in the art would readily appreciate that many modifications are possible without departing in substance from the novel matter and effects of the invention. Accordingly, such modifications are deemed to be included within the scope of the invention.

For example, throughout the specification and the drawings, any terms described at least once with other different terms that encompass broader meaning or are synonymous can be replaced with these different terms in any sections of the specification and the drawings. Furthermore, many changes can be made to the power transmission control device, the power transmission device, the composition and operations of the electronic apparatuses, without being limited to the embodiments described herein.

What is claimed is:

1. A power transmission control device that controls a power transmission device in a contactless power transmission system that transmits power from the power transmission device to a power reception device through electromagnetically coupling a primary coil and a secondary coil, the power transmission control device comprising:
    a power transmission driver control section that controls drive timings of a plurality of switching elements of a power transmission driver that drives the primary coil, the power transmission driver including a first driver and a second driver,
    the power transmission driver controlling section variably controls the power to be transmitted from the power transmission device to the power reception device
    the second driver driving the primary coil such that a drive current flowing through the primary coil is opposite to a direction of a drive current flowing through the primary coil when driven by the first driver;
    each of the first driver and the second driver includes a first switching element to which a high potential power supply is supplied and a second switching element to which a low potential power supply is supplied; and
    the power transmission driver control section varies a phase difference between a first drive signal for driving the first switching element and a second drive signal for driving the second switching element.

2. A power transmission control device according to claim 1, further comprising a transmission power control section that sets a value of power to be transmitted from the power transmission device to the power reception device, the power transmission driver control section controlling the power to be transmitted from the power trans device to the power reception device based on the value of power.

3. A power transmission control device according to claim 1, the power transmission driver including a first transistor and a second transistor that are connected in series between a high potential side power supply and a low potential side power supply, and a third transistor and a fourth transistor that are connected in series between the high potential side power supply and the low potential side power supply,
    the first transistor and the fourth transistor forming a first driver and the third transistor and the second transistor for a second driver;
    the first driver and the second driver alternately drive the first coil;
    the second driver drives the first coil such that a drive current flowing through the first coil is opposite to a direction of a drive current flowing through the primary coil driven by the first driver;
    the power transmission driver control section outputs a first drive signal for driving the first transistor, a second drive signal for driving the second transistor, a third drive signal for driving the third transistor and a fourth drive signal for driving the fourth transistor, and changes a phase shift amount between the first drive signal and the fourth drive signal and a phase shift amount between the second drive signal and the third drive signal, thereby variably controlling transmission power to be transmitted from the power transmission device to the power reception device.

4. A power transmission control device according to claim 3, the power transmission driver control section performing zero-voltage switching of each of the first transistor, the second transistor, the third transistor and the fourth transistor.

5. An electronic apparatus comprising the power transmission device recited in claim 4.

6. A power transmission control device according to claim 1, the power transmission driver control section reducing transmission power to the power reception device in a period in which the power transmission device intermittently transmits power to the power reception device than in a normal transmission period.

7. A power transmission control device according to claim 6, the power transmission driver control section reducing the transmission power to the power reception device in at least one of a standby period in which the power transmission device waits for the power reception device to be placed thereon, and a post-full-charge standby period in which, after a full-charge state of a battery connected to the power reception device has been detected, the necessity of recharging the battery is detected, than in the normal power transmission period.

8. A power transmission control device according to claim 1, the power transmission driver control section reducing the transmission power to the power reception device in a temporary power transmission period that is a continuous power transmission period before starting a normal power transmission, after placement of the power reception device has been detected, than in the normal power transmission period.

9. A power transmission control device according to claim 1, the power transmission driver control section reducing the transmission power to the power reception device, after the normal power transmission is started, in a periodical authentication period that is a period in which the power reception device periodically transmits a foreign object detection signal to the power transmission device, than in the normal power transmission period.

10. A power transmission control device according to claim 1, further comprising a reception processing section that receives feedback information that is sent from the power reception device, the power transmission driver control section variably controlling power to be transmitted from the power transmission device to the power reception device based on the feedback information.

11. A power transmission device comprising:
    a primary coil;

a power transmission driver that drives the primary coil; and the power transmission control device recited in claim 1.

12. A power reception control device that controls operations of a power reception device that receives power transmitted through a primary coil on the power transmission device recited in claim 11 via a secondary coil and a rectification circuit, and supplies the received power to a load, the power reception control device monitoring an output voltage level of the rectification circuit, judges that a foreign object is present between the primary coil and the secondary coil when the output voltage level lowers to a level exceeding an allowable range, and notifies the power transmission device of detection of the foreign object or stops a signal transmission operation to the power transmission device.

13. A power reception device according to claim 12 comprising the power reception control device.

14. A contactless power transmission system comprising: a primary coil, a secondary coil, the power transmission device, and the power reception device recited in claim 13.

15. A contactless power transmission system according to claim 14, the power transmission control device including in the power transmission device executes transmission power control based on feedback information sent from the power reception device.

* * * * *